United States Patent
Ma (10) Patent No.: US 12,429,976 B2
(45) Date of Patent: Sep. 30, 2025

(54) TOUCH DISPLAY PANEL AND DISPLAY DEVICE

(71) Applicant: Wuhan China Star Optoelectronics Semiconductor Display Technology Co., Ltd., Hubei (CN)

(72) Inventor: Liang Ma, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/637,137

(22) PCT Filed: Feb. 7, 2022

(86) PCT No.: PCT/CN2022/075355
§ 371 (c)(1),
(2) Date: Aug. 3, 2023

(87) PCT Pub. No.: WO2023/142156
PCT Pub. Date: Aug. 3, 2023

(65) Prior Publication Data
US 2024/0045542 A1 Feb. 8, 2024

(30) Foreign Application Priority Data
Jan. 25, 2022 (CN) .......................... 202210089012.0

(51) Int. Cl.
G06F 3/041 (2006.01)
(52) U.S. Cl.
CPC ................ *G06F 3/04166* (2019.05)

(58) Field of Classification Search
CPC .... G06F 3/04166; G06F 3/041; G06F 3/0412; G06F 3/04164; G06F 3/0443; G06F 3/0416
See application file for complete search history.

(56) References Cited

U.S. PATENT DOCUMENTS 10,365,743 B2 * 7/2019 Pan ...................... G06F 3/0445
11,269,451 B2 * 3/2022 Fang ..................... G06F 3/0412
(Continued)

FOREIGN PATENT DOCUMENTS

CN 104777955 7/2015
CN 105074806 11/2015
(Continued)

OTHER PUBLICATIONS

International Search Report and the Written Opinion Dated Oct. 20, 2022 From the International Searching Authority Re. Application No. PCT/CN2022/075355 and Its Translation Into English. (16 Pages).
(Continued)

*Primary Examiner* — Temesghen Ghebretinsae
*Assistant Examiner* — Karin Kiyabu (57) ABSTRACT

A touch display panel is disclosed. The touch display panel includes a substrate, a touch layer, and a first demultiplexing circuit. The first demultiplexing circuit includes demultiplexing units. The demultiplexing units include first transistors and second transistors. By disposing a gate electrode of the first transistors connected to a gate electrode of the second transistors in one of the demultiplexing units, time-sharing drive is realized in the first transistor and the second transistor through a signal, which can reduce a number of signals required by the demultiplexing circuits.

14 Claims, 4 Drawing Sheets

(56) References Cited

U.S. PATENT DOCUMENTS

| | | | | |
|---|---|---|---|---|
| 12,045,413 B2* | 7/2024 | Zhou | ............... | G06F 3/041 |
| 12,045,415 B2* | 7/2024 | Ma | ............... | G06F 3/04164 |
| 2016/0328072 A1* | 11/2016 | Yang | ............... | G06F 3/0412 |
| 2017/0168605 A1* | 6/2017 | Xi | ............... | G06F 3/044 |
| 2018/0336809 A1 | 11/2018 | Xi et al. | | |
| 2019/0102026 A1* | 4/2019 | Abe | ............... | G06F 3/0446 |
| 2021/0191549 A1 | 6/2021 | Kim et al. | | |
| 2022/0019317 A1* | 1/2022 | Kim | ............... | G06F 3/04166 |
| 2024/0419285 A1* | 12/2024 | Ma | ............... | G06F 3/0412 |

FOREIGN PATENT DOCUMENTS

| | | |
|---|---|---|
| CN | 106155449 | 11/2016 |
| CN | 106708325 | 5/2017 |
| CN | 106775126 | 5/2017 |
| CN | 113485587 | 10/2021 |
| DE | 102016120632 | 6/2017 |

OTHER PUBLICATIONS

Notification of Office Action and Search Report Dated Apr. 29, 2023 From The State Intellectual Property Office of the People's Republic of China Re. Application No. 202210089012.0 and Its Translation Into English. (23 Pages).

\* cited by examiner

TOUCH DISPLAY PANEL AND DISPLAY DEVICE

RELATED APPLICATIONS

This application is a National Phase of PCT Patent Application No. PCT/CN2022/075355 having International filing date of Feb. 7, 2022, which claims the benefit of priority of Chinese Patent Application No. 202210089012.0 filed on Jan. 25, 2022. The contents of the above applications are all incorporated by reference as if fully set forth herein in their entirety.

FIELD AND BACKGROUND OF THE INVENTION

The present disclosure relates to the field of display technology, and specifically to a touch display panel and a display device.

Touch control technology are widely used in a display field. Because a large number of traces are required to lead out from corresponding touch sensors to non-display regions, demultiplexing circuits are introduced to reduce the number of the traces in the non-display regions. However, the demultiplexing circuits also require a large number of signals for driving control. Especially, as sizes of touch display screens get larger, the number of these signals increases.

Therefore, a touch display panel is needed to provide to reduce the number of the signals required by the demultiplexing circuits in the touch display panels.

It should be noted that the above description of the background of the invention is only for the purpose of facilitating clearly and completely understanding the technical solutions of the present application. Therefore, it should not be considered that the aforesaid technical solutions are known to those skilled in the art just because they appear in the background of the invention of the present application.

SUMMARY OF THE INVENTION

The present application provides a touch display panel and a display device to ease a technical problem that the number of the signals required by the demultiplexing circuits in the touch display panel is large.

On a first aspect, the present application provides a touch display panel, including a substrate, a touch layer, and a first demultiplexing circuit. The substrate includes a display region and a non-display region. The touch layer is disposed on a side of the substrate. The touch layer includes a plurality of touch electrodes disposed in the display region. The first demultiplexing circuit is disposed on the side of the substrate and disposed corresponding to the non-display region. The first demultiplexing circuit includes demultiplexing units electrically connected to corresponding touch electrodes. Each of the demultiplexing units includes first transistors and second transistors. One of the touch electrodes is electrically connected to one of source electrodes and drain electrodes of the first transistors and one of source electrodes or drain electrodes of the second transistors, and gate electrodes of the first transistors are electrically connected to gate electrodes of the second transistors. Wherein, when one of the first transistors or the second transistors is turned on, another one of the first transistors or the second transistors is turned off.

In some embodiments, each of the demultiplexing units further includes control lines. In one same demultiplexing unit, one of the control lines is electrically connected to the gate electrode of the first transistors and the gate electrode of the second transistors.

In some embodiments, the control lines are configured to transmit enable signals, and the enable signals turn on one of the first transistors or the second transistors and turn off one of the first transistors or the second transistors at a same time.

In some embodiments, the touch display panel further includes first pads disposed on the side of the substrate and located in the non-display region. One of the first pads is electrically connected to one of the control lines correspondingly. Furthermore, a number of the first pads is equal to a number of the demultiplexing units, or the number of the first pads is less than a number of a sum of the first transistors and the second transistors.

In some embodiments, in one same first demultiplexing circuit, another ones of the source electrodes or the drain electrodes of each of the first transistors are electrically connected to each other, and another ones of the source electrodes or the drain electrodes of each of the second transistors are configured to receive different touch driving signals.

In some embodiments, in one same first demultiplexing circuit, another ones of the source electrodes or the drain electrodes of each of the second transistors are electrically connected to each other, and another ones of the source electrodes or the drain electrodes of each of the second transistors are configured to receive different touch driving signals.

In some embodiments, the touch display panel further includes a second demultiplexing circuit, the second demultiplexing circuit includes at least one third transistor, one of a source electrode or a drain electrode of one the third transistor is electrically connected to the another one of the source electrode or the drain electrode of each of the first transistors or the another one of the source electrode or the drain electrode of each of the second transistors, and a gate electrode of the at least one third transistor is configured to receive different a driving signal with different phases.

In some embodiments, the touch display panel further includes a second pad. One second pad is electrically connected to another one of the source electrode or the drain electrode of the third transistor; and a number of the second pad is equal to a number of the first demultiplexing circuit, or the number of the second pad is less than a number of the demultiplexing units in one same first demultiplexing circuit.

In some embodiments, the touch display panel further includes touch traces. A terminal of one of the touch traces is connected to one of the touch electrodes. Another terminal of the one of the touch traces is electrically connected to the one of the source electrodes or the drain electrodes of the first transistors and the one of the source electrodes or the drain electrodes of the second transistors, and the touch traces and the touch electrodes are located in a same film layer.

In some embodiments, the first transistors are one of N-channel type transistors or P-channel type transistors, and the second transistors are another one of the N-channel type transistors or the P-channel type transistors.

On a second aspect, the present application provides a display device, including the touch display panel of any of the aforesaid embodiments. The touch display panel includes a display region and a non-display region. The touch electrodes are located in the display region. The first demultiplexing circuit is located in the non-display region.

In the touch display panel and the display device provided by the present application, time-sharing drive can be realized in the first transistor and the second transistor through only one signal by configuring one of the first transistor the second transistor to be turned on while another one of the first transistor the second transistor to be turned off in one of the demultiplexing units. That is, when the signal is high electric potential, one of the first transistor the second transistor can be turned on; and when the signal is low electric potential, another one of the first transistor the second transistor can be turned off. Compared to a technical mean that a first transistor and a second transistor require two signals to be driven, the present application can reduce a number of signals required by the demultiplexing circuits in the touch display panel, thereby can reduce a number of transmission lines for transmitting these signals, and also reducing space occupied by bezels.

DETAILED DESCRIPTION OF SPECIFIC EMBODIMENTS OF THE INVENTION

For making the purposes, technical solutions and effects of the present disclosure be clearer and more definite, the present disclosure will be further described in detail below. It should be understood that the specific embodiments described herein are merely for explaining the present disclosure and are not intended to limit the present disclosure.

Figure 1:
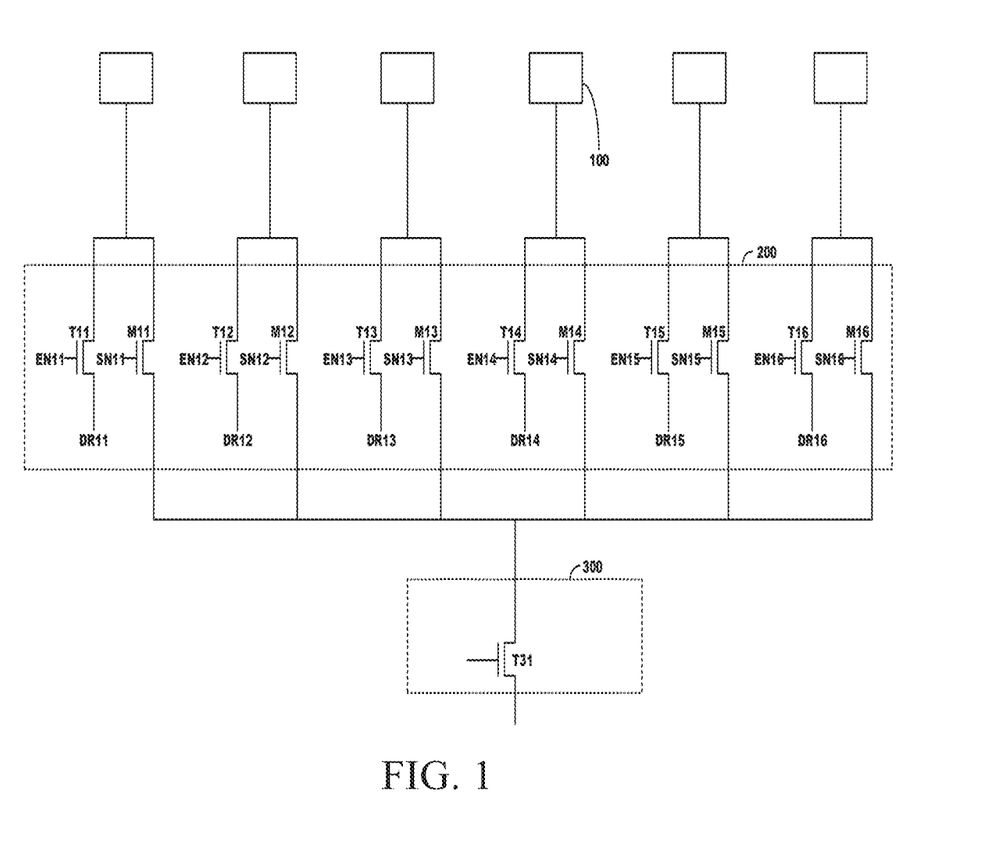
FIG. 1 is a structural schematic diagram of a touch display panel provided by one embodiment of the present application.

Because a large number of traces need to be led out from touch electrodes 100 to designated space, this embodiment provides a touch display panel to reduce the number of the traces. As illustrated in FIG. 1, the touch display panel includes one or a plurality of touch electrodes 100, a first demultiplexing circuit 200, and a second demultiplexing circuit 300. Wherein, the first demultiplexing circuit 200 includes a transistor T11, a transistor M11, a transistor T12, a transistor M12, a transistor T13, a transistor M13, a transistor T14, a transistor M14, a transistor T15, a transistor M15, a transistor T16, and a transistor M16. A touch electrode 100 that is first from left to right is electrically connected to one of the source electrode or drain electrode of the transistor T11 and one of a source electrode or a drain electrode of the transistor M11. A gate electrode of the transistor T11 is configured to receive a control signal EN11. A gate electrode of the transistor M11 is configured to receive a control signal SN11. Another one of the source electrode or the drain electrode of the transistor T11 is configured to receive a touch driving signal DR11. A touch electrode 100 that is second from left to right is electrically connected to one of the source electrode or drain electrode of the transistor T12 and one of a source electrode or a drain electrode of the transistor M12. A gate electrode of the transistor T12 is configured to receive a control signal EN12. A gate electrode of the transistor M12 is configured to receive a control signal SN12. Another one of the source electrode or the drain electrode of the transistor T12 is configured to receive a touch driving signal DR12. A touch electrode 100 that is third from left to right is electrically connected to one of the source electrode or drain electrode of the transistor T13 and one of a source electrode or a drain electrode of the transistor M13. A gate electrode of the transistor T13 is configured to receive a control signal EN13. A gate electrode of the transistor M13 is configured to receive a control signal SN13. Another one of the source electrode or the drain electrode of the transistor T13 is configured to receive a touch driving signal DR13. A touch electrode 100 that is fourth from left to right is electrically connected to one of the source electrode or drain electrode of the transistor T14 and one of a source electrode or a drain electrode of the transistor M14. A gate electrode of the transistor T14 is configured to receive a control signal EN14. A gate electrode of the transistor M14 is configured to receive a control signal SN14. Another one of the source electrode or the drain electrode of the transistor T14 is configured to receive a touch driving signal DR14. A touch electrode 100 that is fifth from left to right is electrically connected to one of the source electrode or drain electrode of the transistor T15 and one of a source electrode or a drain electrode of the transistor M15. A gate electrode of the transistor T15 is configured to receive a control signal EN15. A gate electrode of the transistor M15 is configured to receive a control signal SN15. Another one of the source electrode or the drain electrode of the transistor T15 is configured to receive a touch driving signal DR15. A touch electrode 100 that is sixth from left to right is electrically connected to one of the source electrode or drain electrode of the transistor T16 and one of a source electrode or a drain electrode of the transistor M16. A gate electrode of the transistor T16 is configured to receive a control signal EN16. A gate electrode of the transistor M16 is configured to receive a control signal SN16. Another one of the source electrode or the drain electrode of the transistor T16 is configured to receive a touch driving signal DR16.

Wherein, the second demultiplexing circuit 300 includes one or a plurality of transistors, for example, a transistor T31. One of a source electrode or a drain electrode of the transistor T31 is electrically connected to another one of the source electrode or the drain electrode of the transistor M11, another one of the source electrode or the drain electrode of the transistor M12, another one of the source electrode or the drain electrode of the transistor M13, another one of the source electrode or the drain electrode of the transistor M14, another one of the source electrode or the drain electrode of the transistor M15, and another one of the source electrode or the drain electrode of the transistor M16. In this embodiment, after the six traces led from the six touch electrodes 100 pass through the first demultiplexing circuit 200 and the second demultiplexing circuit 300, only one signal line is needed to connect to another one of the source electrode or the drain electrode of the transistor T31, and touch information of the six touch electrodes 100 can be read out, which greatly reduces the number of the traces extending to the designated space.

Figure 2:
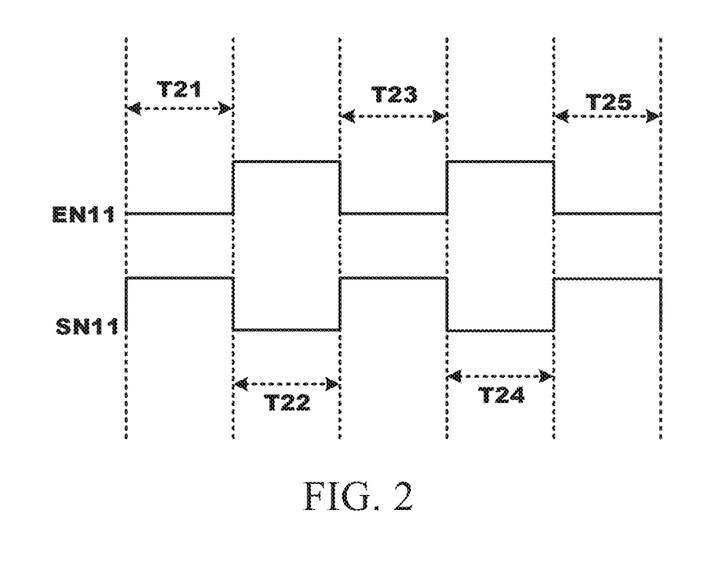
FIG. 2 is a partial time sequence diagram of the touch display panel illustrated in FIG. 1.

In the aforesaid first demultiplexing circuit 200 and/or the second demultiplexing circuit 300, a large number of the transistors are used, and the gate electrodes of each transistor requires one control signal. For example, the gate electrode of the transistor T11 is configured to receive the control signal EN11, and the gate electrode of the transistor M11 is configured to receive the control signal SN11. As illustrated in FIG. 2, in a time period T21, a time period T23, and a time period T25, the control signal EN11 is at low electric potential to turn off the transistor T11, and the control signal SN11 is at high electric potential to turn on the transistor M11 to input the touch driving signal DR11. In a time period T22 and a time period T24, the control signal EN11 is at high electric potential to turn on the transistor T11, and the control signal SN11 is at low electric potential to turn off the transistor M11 to sense the touch electrode 100 that is first from left to right. Correspondingly, two independent transmission lines are needed to transmit the control signal EN11 and the control signal SN11 respectively. In this way, although the number of traces in the designated space is reduced, a number of control signals and a number of transmission lines need to be increased.

Figure 3:
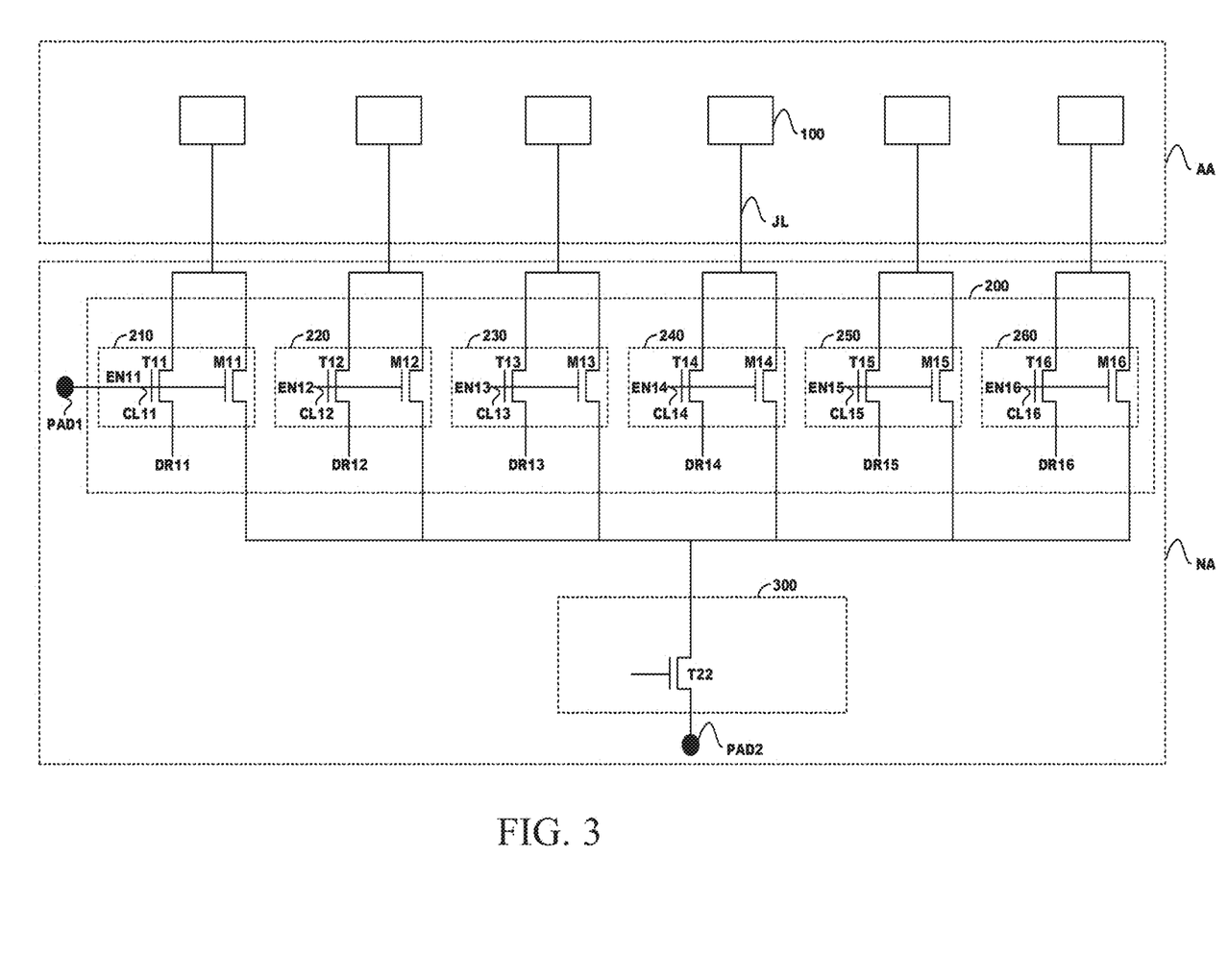
FIG. 3 is a structural schematic diagram of a display device provided by one embodiment of the present application.

Because the technical problem that the corresponding control signals and transmission lines need to be added after the demultiplexing circuit is added, this embodiment provides a touch display panel as illustrated in FIG. 3. The touch display panel includes a substrate, a touch layer, and a first demultiplexing circuit 200. The substrate includes a display region AA and a non-display region NA. The touch layer is disposed on a side of the substrate. The touch layer includes a plurality of touch electrodes 100 disposed in the display region AA. The first demultiplexing circuit 200 is disposed on the side of the substrate and disposed corresponding to the non-display region NA. The first demultiplexing circuit 200 includes demultiplexing units electrically connected to corresponding touch electrodes 100, for example, at least one of a demultiplexing unit 210, a demultiplexing unit 220, a demultiplexing unit 230, a demultiplexing unit 240, a demultiplexing unit 250, or a demultiplexing unit 260. Each of the demultiplexing units includes first transistors and second transistors. One of the touch electrodes 100 is electrically connected to one of source electrodes and drain electrodes of the first transistors and one of source electrodes or drain electrodes of the second transistors, and gate electrodes of the first transistors are electrically connected to gate electrodes of the second transistors. Wherein, when one of the first transistors or the second transistors is turned on, another one of the first transistors or the second transistors is turned off.

It can be understood that in the touch display panel provided by this embodiment, time-sharing drive can be realized in the first transistor and the second transistor through only one signal by configuring one of the first transistor the second transistor to be turned on while another one of the first transistor the second transistor to be turned off in one of the demultiplexing units. That is, when the signal is high electric potential, one of the first transistor the second transistor can be turned on; and when the signal is low electric potential, another one of the first transistor the second transistor can be turned off. Compared to a technical mean that a first transistor and a second transistor require two signals to be driven, the present application can reduce a number of signals required by the demultiplexing circuits in the touch display panel, thereby can reduce a number of transmission lines for transmitting these signals, and also reducing space occupied by bezels.

It should be noted that the first transistor can be one of the transistor T11, the transistor T12, the transistor T13, the transistor T14, the transistor T15, or the transistor M16; and the second transistor can be one of the transistor M11, the transistor M12, the transistor M13, the transistor M14, the transistor M15, or the transistor M16. For example, the transistor T11 corresponds to the transistor M11.

Wherein, the first transistors can be but are not limited to one of N-channel type transistors or P-channel type transistors, and the second transistors are another one of the N-channel type transistors or the P-channel type transistors.

Wherein, each of the demultiplexing units further includes control lines. In one same demultiplexing unit, one of the control lines is electrically connected to the gate electrode of the first transistors and the gate electrode of the second transistors.

For example, a control line CL11 of the demultiplexing unit 210 is electrically connected to the gate electrode of the transistor T11 and the gate electrode of the transistor M11, so the enable signal EM11 transmitted by the control line CL11 can realize time-sharing conduction of the transistor T11 and the transistor M11. Similarly, a control line CL12 of the demultiplexing unit 220 is electrically connected to the gate electrode of the transistor T12 and the gate electrode of the transistor M12, so the enable signal EM12 transmitted by the control line CL12 can realize time-sharing conduction of the transistor T12 and the transistor M12. A control line CL13 of the demultiplexing unit 230 is electrically connected to the gate electrode of the transistor T13 and the gate electrode of the transistor M13, so the enable signal EM13 transmitted by the control line CL13 can realize time-sharing conduction of the transistor T13 and the transistor M13. A control line CL14 of the demultiplexing unit 240 is electrically connected to the gate electrode of the transistor T14 and the gate electrode of the transistor M14, so the enable signal EM14 transmitted by the control line CL14 can realize time-sharing conduction of the transistor T14 and the transistor M14. A control line CL15 of the demultiplexing unit 250 is electrically connected to the gate electrode of the transistor T15 and the gate electrode of the transistor M15, so the enable signal EM15 transmitted by the control line CL15 can realize time-sharing conduction of the transistor T15 and the transistor M15. A control line CL16 of the demultiplexing unit 260 is electrically connected to the gate electrode of the transistor T16 and the gate electrode of the transistor M16, so the enable signal EM16 transmitted by the control line CL16 can realize time-sharing conduction of the transistor T16 and the transistor M16.

It can be understood that in this embodiment, not only the number of enable signals required by the first demultiplexing circuit 200 is reduced to one half, but also, compared to the touch display panel illustrated in FIG. 1, the number of control lines required by the first demultiplexing circuit 200 in this embodiment can also be reduced to one half.

In one of the embodiments, the control lines are configured to transmit enable signals. The enable signals turn on one of the first transistors or the second transistors and turn off one of the first transistors or the second transistors at a same time. For example, the enable signal has a high electric potential capable of turning on an N-channel type transistor and a low potential capable of turning on a P-channel type transistor.

It can be understood that in this embodiment, each enable signal can be a square wave signal or a pulse signal. Either of the two has two electric potentials, one of the electric potentials is a high electric potential that can turn on the N-channel type transistor turn off the P-channel type transistor, and another one of the electric potentials is a low electric potential that can turn off the N-channel type transistor turn on the P-channel type transistor.

In one of the embodiments, the touch display panel further includes one or a plurality of first pads disposed on the side of the substrate and located in the non-display region NA, for example, pads PAD1. One of the first pads is electrically connected to one of the control lines correspondingly. A number of the first pads is equal to a number of the demultiplexing units or a number of the control lines, or the number of the first pads is less than a number of a sum of the first transistors and the second transistors. It can be understood that these first pads are configured to connect output terminals of signal sources and corresponding control lines, for example, the pads PAD1 are electrically connected to control lines CL11. In this embodiment, as the number of control lines decreases, the number of corresponding first pads also decreases. Whether the number of control lines or the first pads does reduce, the occupied space in the display panel can be reduced, especially when the space of the display panel is compact, it is more precious to be able to save space.

In one of the embodiments, in one same first demultiplexing circuit 200, another ones of the source electrodes or the drain electrodes of each of the first transistors are electrically connected to each other, and another ones of the source electrodes or the drain electrodes of each of the second transistors are configured to receive different touch driving signals.

For example, as illustrated in FIG. 3, another one of the source electrode or the drain electrode of the transistor T11, another one of the source electrode or the drain electrode of the transistor T12, another one of the source electrode or the drain electrode of the transistor T13, another one of the source electrode or the drain electrode of the transistor T14, another one of the source electrode or the drain electrode of the transistor T15, and another one of the source electrode or the drain electrode of the transistor T16 are configured to respectively and correspondingly receive the touch driving signal DR11, the touch driving signal DR12, the touch driving signal DR13, the touch driving signal DR14, the touch driving signal DR15, and the touch driving signal DR16 in sequence. Therefore, individual driving of each touch electrode 100 can be realized. Another one of the source electrode or the drain electrode of the transistor M11 is electrically connected to another one of the source electrode or the drain electrode of the transistor M12, another one of the source electrode or the drain electrode of the transistor M13, another one of the source electrode or the drain electrode of the transistor M14, another one of the source electrode or the drain electrode of the transistor M15, and another one of the source electrode or the drain electrode of the transistor M16. In this way, the number of traces can be reduced, and six touch electrodes 100 can be sensed through one transmission terminal.

In one of the embodiments, in one same first demultiplexing circuit 200, another ones of the source electrodes or the drain electrodes of each of the source electrode transistors are electrically connected to each other, and another ones of the source electrodes or the drain electrodes of each of the second transistors are configured to receive different touch driving signals.

For example, another one of the source electrode or the drain electrode of the transistor M11, another one of the source electrode or the drain electrode of the transistor M12, another one of the source electrode or the drain electrode of the transistor M13, another one of the source electrode or the drain electrode of the transistor M14, another one of the source electrode or the drain electrode of the transistor M15, and another one of the source electrode or the drain electrode of the transistor M16 are configured to respectively and correspondingly receive the touch driving signal DR11, the touch driving signal DR12, the touch driving signal DR13, the touch driving signal DR14, the touch driving signal DR15, and the touch driving signal DR16 in sequence. Therefore, individual driving of each touch electrode 100 can be realized. Another one of the source electrode or the drain electrode of the transistor T11 is electrically connected to another one of the source electrode or the drain electrode of the transistor T12, another one of the source electrode or the drain electrode of the transistor T13, another one of the source electrode or the drain electrode of the transistor T14, another one of the source electrode or the drain electrode of the transistor T15, and another one of the source electrode or the drain electrode of the transistor T16. In this way, the number of traces can be reduced, and six touch electrodes 100 can be sensed through one transmission terminal.

In one of the embodiments, the touch display panel further includes a second demultiplexing circuit 300, the second demultiplexing circuit 300 includes at least one third transistor, one of a source electrode or a drain electrode of one the third transistor is electrically connected to the another one of the source electrode or the drain electrode of each of the first transistors or the another one of the source electrode or the drain electrode of each of the second transistors, and a gate electrode of the at least one third transistor is configured to receive different a driving signal with different phases.

It should be noted that the third transistor can be a transistor T22. One of a source electrode or a drain electrode of the transistor T22 can be electrically connected to another one of the source electrode or the drain electrode of the transistor M11, another one of the source electrode or the drain electrode of the transistor M12, another one of the source electrode or the drain electrode of the transistor M13, another one of the source electrode or the drain electrode of the transistor M14, another one of the source electrode or the drain electrode of the transistor M15, and another one of the source electrode or the drain electrode of the transistor M16; or one of the source electrode or the drain electrode of the transistor T22 can also be electrically connected to another one of the source electrode or the drain electrode of the transistor T11, another one of the source electrode or the drain electrode of the transistor T12, another one of the source electrode or the drain electrode of the transistor T13, another one of the source electrode or the drain electrode of the transistor T14, another one of the source electrode or the drain electrode of the transistor T15, and another one of the source electrode or the drain electrode of the transistor T16. In this way, under the control of the corresponding driving signal, the six touch electrodes 100 can be sensed through another one of the source electrode or the drain electrode of the transistor T22.

It should be noted that each third transistor in the second demultiplexing circuit 300 corresponds to one first demultiplexing circuit 200.

In one of the embodiments, the touch display panel further includes a second pad, for example, a pad PAD2. One second pad is electrically connected to another one of the source electrode or the drain electrode of the third transistor; and a number of the second pad is equal to a number of the first demultiplexing circuit 200, or the number of the second pad is less than a number of the demultiplexing units 200 in one same first demultiplexing circuit.

It can be understood that in this embodiment, because the first demultiplexing circuit 200 and the second demultiplexing circuit 300 are adopted, a number of traces extending to the second pad is reduced, while a usage number of the second pads is also reduced, which can save space.

In one of the embodiments, the touch display panel further includes touch traces, for example, touch traces JL. A terminal of one of the touch traces is connected to one of the touch electrodes 100. Another terminal of the one of the touch traces is electrically connected to the one of the source electrodes or the drain electrodes of the first transistors and the one of the source electrodes or the drain electrodes of the second transistors, and the touch traces and the touch electrodes 100 are located in a same film layer.

It can be understood that in this embodiment, disposing the touch traces and the touch electrodes 100 in a same layer can reduce a thickness of the touch display panel.

Figure 4:
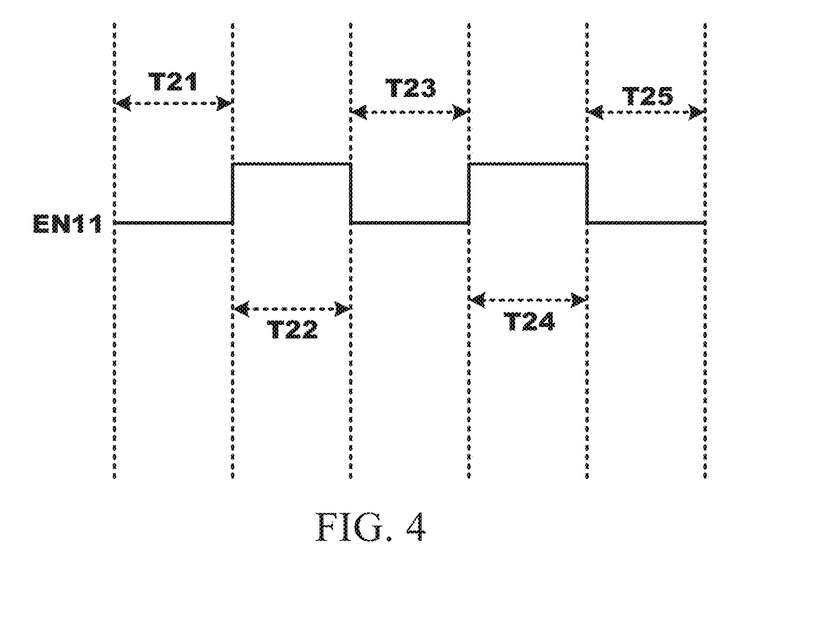
FIG. 4 is a partial time sequence diagram of the display device illustrated in FIG. 3.

As illustrated in FIG. 3 and FIG. 4, in the demultiplexing unit 210, the gate electrode of the transistor T11 and the gate electrode of the transistor M11 are configured to receive the control signal EN11. In a time period T21, a time period T23, and a time period T25, the enable signal EN11 is at low electric potential, the transistor T11 is turned on, and the transistor M11 is turned off. At this time, the touch driving signal DR11 can be inputted into the touch electrode 100 that is first from left to right. In a time period T22 and a time period T21, the enable signal EN11 is at high electric potential, the transistor T11 is turned off, and the transistor M11 is turned on. At this time, the touch electrode 100 that is first from left to right can be sensed.

In one of the embodiments, this embodiment provides a display device including the touch display panel in at least one embodiment mentioned above.

It can be understood that in the display device provided by this embodiment, time-sharing drive can be realized in the first transistor and the second transistor through only one signal by configuring one of the first transistor the second transistor to be turned on while another one of the first transistor the second transistor to be turned off in one of the demultiplexing units. That is, when the signal is high electric potential, one of the first transistor the second transistor can be turned on; and when the signal is low electric potential, another one of the first transistor the second transistor can be turned off. Compared to a technical mean that a first transistor and a second transistor require two signals to be driven, the present application can reduce a number of signals required by the demultiplexing circuits in the touch display panel, thereby can reduce a number of transmission lines for transmitting these signals, and also reducing space occupied by bezels.

It should be noted that the aforesaid touch display panel can include a display region AA, a non-display region NA, i.e., lower bezel region. Wherein, the touch electrode 100 and/or the touch trace can be located in the display region AA, and the first demultiplexing circuit 200 and the second demultiplexing circuit 300 can be located in the non-display region NA.

It can be understood, that for those of ordinary skill in the art, various other corresponding changes and modifications can be made according to the technical solutions and technical ideas of the present disclosure, and all such changes and modifications are intended to fall within the scope of protection of the claims of the present disclosure.

What is claimed is:

1. A touch display panel, comprising:
   a substrate comprising a display region and a non-display region;
   a touch layer disposed on a side of the substrate, wherein the touch layer comprises a plurality of touch electrodes disposed in the display region;
   a first demultiplexing circuit disposed on the side of the substrate and disposed corresponding to the non-display region, wherein the first demultiplexing circuit comprises demultiplexing units electrically connected to corresponding touch electrodes, the demultiplexing units comprise first transistors and second transistors, one of the touch electrodes is electrically connected to one of source electrodes or drain electrodes of the first transistors and one of source electrodes or drain electrodes of the second transistors, and gate electrodes of the first transistors are electrically connected to gate electrodes of the second transistors,
   wherein when one of the first transistors or the second transistors is turned on, another one of the first transistors or the second transistors is turned off; in the first demultiplexing circuit, another one of the source electrodes or the drain electrodes of each of the second transistors are electrically connected to each other, and another one of the source electrodes or the drain electrodes of each of the first transistors are configured to receive different touch driving signals; and
   a second demultiplexing circuit comprising at least one third transistor, one of a source electrode or a drain electrode of the at least one third transistor is electrically connected to the another one of the source electrodes or the drain electrodes of each of the second transistors, a gate electrode of the at least one third transistor is configured to receive a corresponding driving signal, the plurality of touch electrodes are sensed through another one of the source electrode or the drain electrode of the at least one third transistor, each third transistor in the second demultiplexing circuit corresponds to one first demultiplexing circuit.

2. The touch display panel as claimed in claim 1, wherein each of the demultiplexing units comprises control lines; and in each of the demultiplexing units, one of the control lines is electrically connected to a gate electrode of the first transistors and a gate electrode of the second transistors.

3. The touch display panel as claimed in claim 2, wherein the control lines are configured to transmit enable signals, and the enable signals turn on one of the first transistors or the second transistors and turn off one of the first transistors or the second transistors at a same time.

4. The touch display panel as claimed in claim 2, wherein the touch display panel comprises first pads disposed on the side of the substrate and located in the non-display region;
   one of the first pads is electrically connected to one of the control lines correspondingly; and
   a number of the first pads is equal to a number of the demultiplexing units, or the number of the first pads is less than a number of a sum of the first transistors and the second transistors.

5. The touch display panel as claimed in claim 1, wherein the touch display panel comprises a second pad; the second pad is electrically connected to the another one of the source electrode or the drain electrode of the at least one third transistor; and a number of the second pad is equal to a number of the first demultiplexing circuit, or the number of the second pad is less than a number of the demultiplexing units in the first demultiplexing circuit.

6. The touch display panel as claimed in claim 1, wherein the touch display panel comprises touch traces, a terminal of one of the touch traces is connected to one of the touch electrodes, another terminal of the one of the touch traces is electrically connected to the one of the source electrodes or the drain electrodes of the first transistors and the one of the source electrodes or the drain electrodes of the second transistors, and the touch traces and the touch electrodes are located in a same film layer.

7. The touch display panel as claimed in claim 1, wherein a first transistor is one of a N-channel type transistor or a P-channel type transistor, and a second transistor is another one of the N-channel type transistor or the P-channel type transistor.

8. A display device, comprising a touch display panel, wherein the touch display panel comprises:
   a substrate comprising a display region and a non-display region;
   a touch layer disposed on a side of the substrate, wherein the touch layer comprises a plurality of touch electrodes disposed in the display region;
   a first demultiplexing circuit disposed on the side of the substrate and disposed corresponding to the non-display region, wherein the first demultiplexing circuit comprises demultiplexing units electrically connected to corresponding touch electrodes, the demultiplexing units comprise first transistors and second transistors,
   one of the touch electrodes is electrically connected to one of source electrodes or drain electrodes of the first transistors and one of source electrodes or drain electrodes of the second transistors, and gate electrodes of the first transistors are electrically connected to gate electrodes of the second transistors,
   wherein when one of the first transistors or the second transistors is turned on, another one of the first transistors or the second transistors is turned off; in the first demultiplexing circuit, another one of the source electrodes or the drain electrodes of each of the second transistors are electrically connected to each other, and another one of the source electrodes or the drain electrodes of each of the first transistors are configured to receive different touch driving signals; and
   a second demultiplexing circuit comprising at least one third transistor, one of a source electrode or a drain electrode of the at least one third transistor is electrically connected to the another one of the source electrodes or the drain electrodes of each of the second transistors, a gate electrode of the at least one third transistor is configured to receive a corresponding driving signal, the plurality of touch electrodes are sensed through another one of the source electrode or the drain electrode of the at least one third transistor, each third transistor in the second demultiplexing circuit corresponds to one first demultiplexing circuit.

9. The display device as claimed in claim 8, wherein each of the demultiplexing units comprises control lines; and in each of the demultiplexing units, one of the control lines is electrically connected to a gate electrode of the first transistors and a gate electrode of the second transistors.

10. The display device as claimed in claim 9, wherein the control lines are configured to transmit enable signals, and the enable signals turn on one of the first transistors or the second transistors and turn off one of the first transistors or the second transistors at a same time.

11. The display device as claimed in claim 9, wherein the touch display panel comprises first pads disposed on the side of the substrate and located in the non-display region; one of the first pads is electrically connected to one of the control lines correspondingly; and a number of the first pads is equal to a number of the demultiplexing units, or the number of the first pads is less than a number of a sum of the first transistors and the second transistors.

12. The display device as claimed in claim 8, wherein the touch display panel comprises a second pad; the second pad is electrically connected to the another one of the source electrode or the drain electrode of the at least one third transistor; and a number of the second pad is equal to a number of the first demultiplexing circuit, or the number of the second pad is less than a number of the demultiplexing units in the first demultiplexing circuit.

13. The display device as claimed in claim 8, wherein the touch display panel comprises touch traces, a terminal of one of the touch traces is connected to one of the touch electrodes, another terminal of the one of the touch traces is electrically connected to the one of the source electrodes or the drain electrodes of the first transistors and the one of the source electrodes or the drain electrodes of the second transistors, and the touch traces and the touch electrodes are located in a same film layer.

14. The display device as claimed in claim 8, wherein a first transistor is one of a N-channel type transistor or a P-channel type transistor, and a second transistor is another one of the N-channel type transistor or the P-channel type transistor.

* * * * *